US011445233B2

(12) United States Patent
Yoshizawa et al.

(10) Patent No.: US 11,445,233 B2
(45) Date of Patent: Sep. 13, 2022

(54) VIDEO DISPLAY DEVICE AND COOPERATIVE CONTROL METHOD IN VIDEO DISPLAY DEVICE

(71) Applicant: MAXELL, LTD., Kyoto (JP)

(72) Inventors: Kazuhiko Yoshizawa, Kyoto (JP); Akira Ishiyama, Kyoto (JP); Yasunobu Hashimoto, Kyoto (JP); Hiroshi Shimizu, Kyoto (JP); Mitsunobu Watanabe, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 16/313,850

(22) PCT Filed: Sep. 15, 2016

(86) PCT No.: PCT/JP2016/077306
§ 371 (c)(1),
(2) Date: Dec. 27, 2018

(87) PCT Pub. No.: WO2018/051469
PCT Pub. Date: Mar. 22, 2018

(65) Prior Publication Data
US 2019/0149871 A1    May 16, 2019

(51) Int. Cl.
*H04N 7/18* (2006.01)
*H04N 21/41* (2011.01)
(Continued)

(52) U.S. Cl.
CPC ..... *H04N 21/41265* (2020.08); *G06F 3/0416* (2013.01); *G06F 9/30003* (2013.01);
(Continued)

(58) Field of Classification Search
CPC ......... H04N 21/4126; H04N 21/42208; H04N 21/436; H04N 21/43637; G06F 3/0416
See application file for complete search history.

(56) References Cited

U.S. PATENT DOCUMENTS 9,055,259 B2 *   6/2015  An .................. H04N 21/41265
2014/0019994 A1 * 1/2014  Miyazawa ............. G06F 9/465
                                                     719/315
(Continued)

FOREIGN PATENT DOCUMENTS

JP      2004-356831 A    12/2004
JP      2014-17735 A      1/2014
(Continued)

OTHER PUBLICATIONS

International Search Report issued in International Application No. PCT/JP2016/077306 dated Dec. 20, 2016.

*Primary Examiner* — Mulugeta Mengesha
(74) *Attorney, Agent, or Firm* — McDermott Will & Emery LLP

(57) ABSTRACT

For establishing cooperation among an external device 30, a video display device 10 and a remote control terminal 20 and to achieve cooperative operation among these devices that affords a high level of operability to a user with less burden, the video display device 10 to which an external device 30 and a remote control terminal 20 that remotely operates the external device can be connected, comprising: a connection detection section 140 configured to detect a connection of the external device 30 to the video display device 10; a cooperation establishment section 120 configured to generate a start signal for initiate an application software accepting an operation instruction to the external device 30 on the remote control terminal 20 when the connection detection section 140 detects the connection of the external device 30; and a communication interface 18 configured to transmit the start signal to the remote control terminal.

8 Claims, 15 Drawing Sheets

(51) Int. Cl.
  *H04N 21/436*   (2011.01)
  *G06F 3/041*    (2006.01)
  *G06F 9/30*     (2018.01)
  *H04N 21/422*   (2011.01)
  *H04N 21/4363*  (2011.01)

(52) U.S. Cl.
  CPC ..... *H04N 21/42208* (2013.01); *H04N 21/436* (2013.01); *H04N 21/43637* (2013.01)

(56) References Cited

U.S. PATENT DOCUMENTS

| | | | |
|---|---|---|---|
| 2014/0313419 A1* | 10/2014 | Kim | H04N 21/42203 |
| | | | 348/734 |
| 2014/0359663 A1 | 12/2014 | Nakanishi | |
| 2015/0237401 A1* | 8/2015 | Morimoto | H04N 21/436 |
| | | | 725/14 |
| 2018/0270442 A1* | 9/2018 | Park | G06F 3/0482 |

FOREIGN PATENT DOCUMENTS

| | | |
|---|---|---|
| JP | 2014-235534 A | 12/2014 |
| JP | 2016-025599 A | 2/2016 |

\* cited by examiner

FIG. 5

| CANDIDATE SMART PHONE | CANDIDATE VIDEO CAMERA | | |
|---|---|---|---|
| DEVICE ID | DEVICE ID | RELAY APPLICATION NAME | INSTALL |
| SP01 | VC01 | RLA01 | 1 |
| SP02 | | | |
| SP03 | | | |
| SP01 | VC02 | RLA02 | 0 |
| SP03 | | | |
| | | | |

FIG. 6

| CANDIDATE TELEVISION DEVICE ID ~610 | CANDIDATE VIDEO CAMERA DEVICE ID ~620 | REMOTE CONTROL APPLICATION NAME ~630 | INSTALL ~640 |
|---|---|---|---|
| TV01 | VC01 | RMA11 | 1 |
|  | VC02 | RMA12 | 0 |
|  | VC03 | RMA13 | 1 |
| TV02 | VC01 | RMA21 | 1 |
|  | VC02 | RMA22 | 0 |
|  | VC03 | RMA23 | 1 |
|  |  |  |  |

600

SCROLL

VIDEO DISPLAY DEVICE AND COOPERATIVE CONTROL METHOD IN VIDEO DISPLAY DEVICE

CROSS REFERENCE

This application is the U.S. National Phase under 35 U.S.C. § 371 of International Application No. PCT/JP2016/077306 filed on Sep. 15, 2016, the entire contents which is hereby incorporated by reference.

TECHNICAL FIELD

The present invention relates to a device cooperative technology among an external device that holds video data, a video display device, and a remote control terminal.

BACKGROUND ART

As a background art of the present technical field, in Patent Literature 1 describes "to provide a controller, transmitter, and transmission method for improving operability in a video transmission system in which a video content stored in a STB (set-top box) connected to plural monitors can be operated through a smart phone and the like", as a problem to be solved.

As a solution, there is a description that "a video data controller (smart phone) includes: a specific information dispatching instruction transmission unit (short-range wireless communication unit, Wi-Fi communication unit) configured so as to be capable of transmitting a specific information dispatching instruction for instructing a display device (bedroom TV) to become in a state of wirelessly dispatching specific information; a display device identification unit (control unit) configured so as to be capable of identifying a nearest display device on the basis of radio wave strength of the specific information; and a video data transmission instruction transmission unit (Wi-Fi communication unit) configured so as to be capable of transmitting a video data transmission instruction for instructing a video data transmitter (server) configured so as to be capable of wirelessly transmitting video data to transmit the video data to the nearest display device (excerption of the abstract)".

CITATION LIST

Patent Literature

PATENT LITERATURE 1: JP-A No. 2016-025599

SUMMARY OF INVENTION

Technical Problem

However, in the technology described in the literature described above, it is required for a user possessing the video data control unit (smart phone) to independently instruct the display device (television) and the video data transmission device (server) and to thereby establish cooperation among the video data control unit (smart phone), the display device (television), and the video data transmission device (server) which is not user-friendly. Further, as a device substituting the video data transmission device (server) described above, an external device such as a video camera and a video recorder is conceivable; however, a cooperative operation required when an external device connected to the display device (television) described above is changed has not been taken into consideration.

The present invention has been achieved in view of the circumstances described above, and its object is to provide a technology for establishing cooperation among an external device, a video display device, and a remote control terminal with less burden in an environment where various kinds of external devices are possibly connected to the video display device, and for achieving a cooperative operation among the devices that afford a high level of operability to the user.

Solution to Problem

In order to solve the problem described above, the present invention is, for example, a video display device to which an external device and a remote control terminal that remotely operates the external device can be connected, including: a connection detection section configured to detect a connection of the external device to the video display device; a cooperation establishment section configured to generate a start signal for initiate an application software accepting an operation instruction to the external device on the remote control terminal when the connection detection section detects the connection of the external device; and a communication interface configured to transmit the start signal to the remote control terminal.

Advantageous Effects of Invention

According to the present invention, it is possible to establish cooperation among an external device, a video display device, and a remote control terminal with less burden in an environment where various kinds of external devices are possibly connected to the video display device, and to achieve a cooperative operation among the devices that afford a high level of operability to the user. Problems, configurations, and effects other than those described above will be clarified by explanation described below.

BRIEF DESCRIPTION OF DRAWINGS

FIG. 5 is an explanatory drawing for explaining a relay table of the first embodiment.

FIG. 6 is an explanatory drawing for explaining a cooperation table of the first embodiment.

DESCRIPTION OF EMBODIMENTS

First Embodiment

Below, the first embodiment of the present invention will be explained using the drawings. Moreover, the embodiments described below are examples for achieving the present invention and are to be appropriately amended or altered according to the configuration of the device to which the present invention is applied and various conditions. Furthermore, the present invention is not limited to the embodiments described below and may be configured by appropriately combining a part of each embodiment described below.

Figure 1:
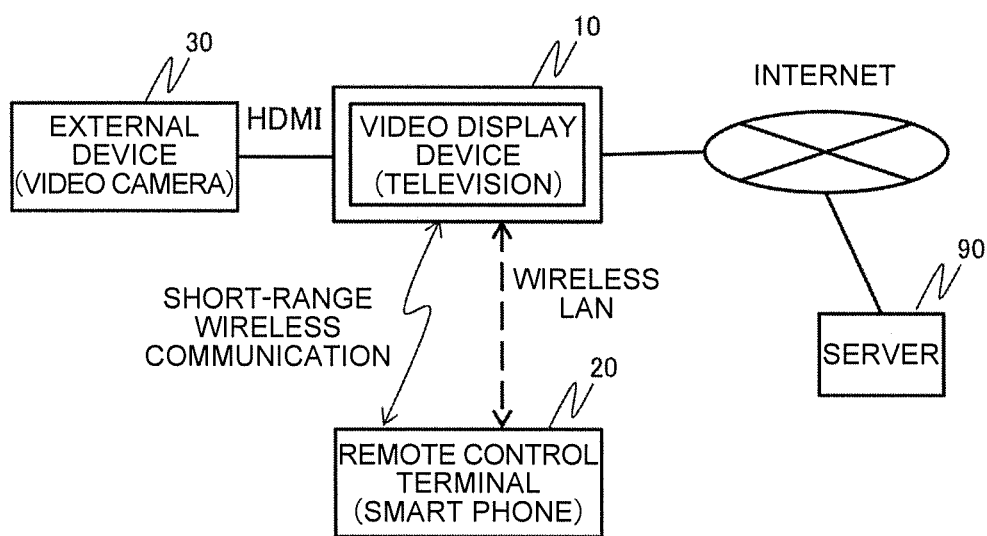
FIG. 1 is a configuration diagram of a 3-party cooperation system of a first embodiment.

FIG. 1 is a configuration diagram of a 3-party cooperation system of the present embodiment. As shown in the present drawing, the 3-party cooperation system of the present embodiment is provided with a video display device 10, a remote control terminal 20, and an external device 30. The video display device 10 and the external device 30 are connected to each other by an HDMI (High-Definition Multimedia Interface) (trade mark) cable and the like for example. Also, the remote control terminal 20 is connected to the video display device 10 by short-range wireless communication (NFC, IR communication, Bluetooth (trade mark), and the like for example) or by a wireless LAN. Further, the video display device 10 is connected to a server 90 through the internet.

The video display device 10 acquires video data from the outside, and displays the video data on a display section provided to the video display device 10 itself. The video display device 10 of the present embodiment is a television, a monitor without a TV tuner, and the like, for example. Hereinafter, explanation will be made exemplifying a television. The television 10 is further provided with an access point function of the wireless LAN, and is connected to the server 90 through the internet.

The remote control terminal 20 stores application software (will be hereinafter referred to as "remote control application") that achieves a remote control function. In the remote control terminal 20, the hardware that provided to the remote control terminal 20 executes the remote control application, and thus the remote control function is achieved. The remote control terminal 20 of the present embodiment is an information processing terminal having a communication function such as a smart phone, a tablet terminal, a mobile terminal for example. Hereinafter, explanation will be made exemplifying a smart phone.

The external device 30 holds or relays video data. Moreover, the external device 30 is connected to the television 10, and transmits the video data held or relayed to the television 10. The external device 30 of the present embodiment is a video camera, a video recorder, a set-top box (STB) and the like for example. Hereinafter, explanation will be made exemplifying a video camera.

Although the video camera 30 and the television 10 are connected to each other by an HDMI cable, means for connecting the both are not limited to it. A connection is possible regardless of wired or wireless as far as the connection is through an interface that connects the video camera 30 and the television 10 on a one-to-one basis. Also, instead of the video camera 30, a USB memory device, which can be connected to a USB terminal (not illustrated) of the television 10, may be used. In this case, the USB memory device may be connected to the television 10 using a USB cable or directly. Further, although the smart phone 20 and the television 10 are connected to each other by the short-range wireless communication also in the present embodiment, this function may be omitted.

[Hardware Configuration]

Below, with respect to each of the television 10, the smart phone 20, and the video camera 30 in the 3-party cooperation system of the present embodiment, detailed configuration will be explained.

[Television]

Figure 2A:
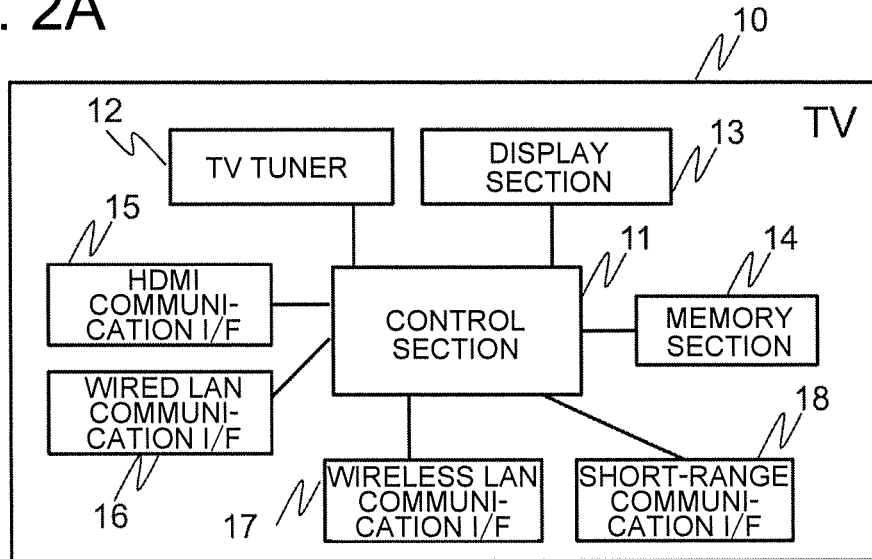
FIG. 2A is a block diagram of a television (TV) of the first embodiment.

FIG. 2A is a block diagram of the television 10 of the present embodiment. The television 10 is provided with a control section 11, a TV tuner 12, a display section 13, a memory section 14, an HDMI communication interface (I/F) 15, a wired LAN communication interface (I/F) 16, a wireless LAN communication interface (I/F) 17, and a short-range communication interface (I/F) 18.

The control section 11 is a micro-processor unit that controls the entire television 10 according to a predetermined program.

The memory section 14 includes a program region, a temporary memory region, and a storage memory region. The program region is a region where a basic operation program and other application programs are expanded when such programs are executed. The temporary memory region temporarily holds data according to necessity in executing various application programs. The storage memory region stores various set values, various programs, moving image data, and the like even in a state where electricity is not supplied. For the storage memory region, a device such as a flash ROM, an SSD (Solid State Drive), an HDD (Hard Disc Drive) is used for example.

Also, in the present embodiment, the television 10 is capable of extending a function by downloading a new application program from an application server through the internet. At this time, the downloaded new application program is stored in the storage memory region of the memory section 14.

In the television 10 of the present embodiment, the control section 11 expands new application programs stored in the storage memory region in the program region and executes the expanded new application programs, and thus the television 10 achieves various new functions.

The display section 13 is a display device such as a liquid crystal panel or an organic EL display for example. The display section 13 of the present embodiment displays an image and the like obtained by that the TV tuner 12 described below receives broadcasted radio wave received by an antenna and subjects the radio wave to image processing.

The TV tuner 12 outputs the broadcasted radio wave received by the antenna as a video signal. The TV tuner 12 is provided with a terrestrial digital tuner, a BS/CS digital tuner, an OFDM demodulation section, an MPEG decoder, and the like.

The HDMI communication I/F 15 is an interface section for HDMI communication. The HDMI communication I/F 15 is provided with a TMDS (Transition Minimized Differential Signaling) process section, a decoding section that decodes an encoded video signal received by the TMDS process section, a CEC (Consumer Electronics Control) control section, and the like, and connects the television 10 to the video camera 30 and the like on a one-to-one basis.

The wireless LAN communication I/F 17 functions as an access point for the wireless LAN, and transmits/receives data to/from a device such as the smart phone 20 having a wireless LAN communication I/F.

The wired LAN communication I/F 16 is connected to the internet through a home gateway, and transmits/receives data to/from the server 90.

The short-range communication I/F 18 performs short-range wireless communication (NFC, IR communication, Bluetooth, and the like) between the smart phone 20 and the like.

[Smart Phone]

Figure 3A:
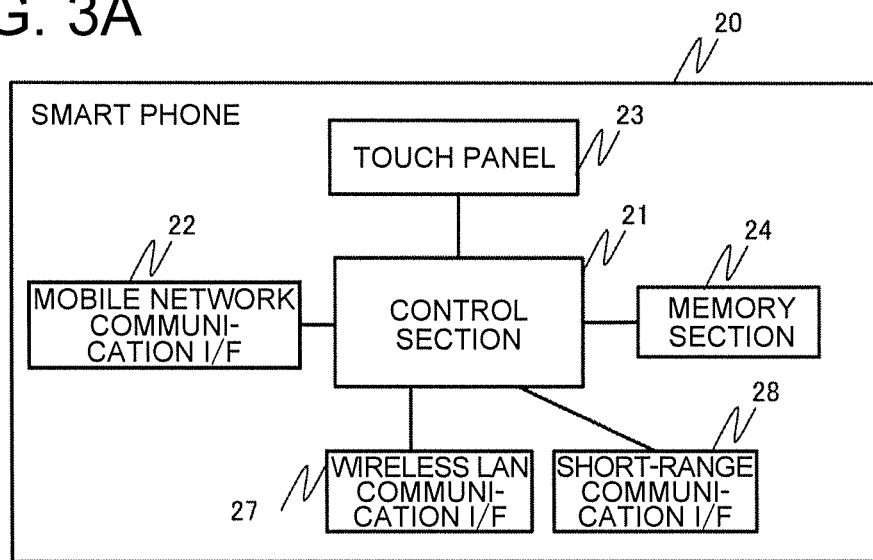
FIG. 3A is a block diagram of a smart phone of the first embodiment.

FIG. 3A is a block diagram of the smart phone 20 of the present embodiment. The smart phone 20 is provided with a control section 21, a mobile network communication I/F 22, a touch panel 23, a memory section 24, a wireless LAN communication I/F 27, and a short-range communication I/F 28.

The control section 21 is a micro-processor unit that controls the entire smart phone 20 according to a predetermined program.

The memory section 24 includes a program region, a temporary memory region, and a storage memory region. The program region is a region where a basic operation program and other application programs are expanded when such programs are executed. The temporary memory region temporarily holds data according to necessity in executing various application programs. The storage memory region stores various set values, various programs, moving image data, and the like even in a state where electricity is not supplied. For the storage memory region, a device such as a flash ROM, an SSD, an HDD is used for example.

The smart phone 20 of the present embodiment is capable of extending a function by downloading a new application program including the remote control application described above from an application server through the internet and a wireless LAN access point. At this time, the downloaded new application program is stored in the storage memory region of the memory section 24.

In the smart phone 20 of the present embodiment, the control section 21 expands new application programs stored in the storage memory region in the program region and executes the expanded new application programs, and thus the smart phone 20 is capable of achieving various new functions.

The touch panel 23 is a device obtained by combining, for example, a display device such as a liquid crystal panel or an organic EL display and a signal input device such as a touch panel. The smart phone 20 of the present embodiment functions as a remote controller of the television 10 and the video camera 30. The touch panel 23 displays a remote controller screen and the like of this time. Also, the touch panel 23 detects the operation input by detecting the operation of contacting the screen by the user.

The mobile network communication I/F 22 performs wireless communication with a base station of the mobile telephone communication network, and performs telephone communication (phone talk) and transmits/receives data.

The wireless LAN communication I/F 27 transmits/receives data to/from the television 10, the video camera 30, or the server 90 through a wireless LAN access point.

The short-range communication I/F 28 performs short-range wireless communication (NFC, IR communication, Bluetooth, and the like) with the television 10.

[Video Camera]

Figure 4:
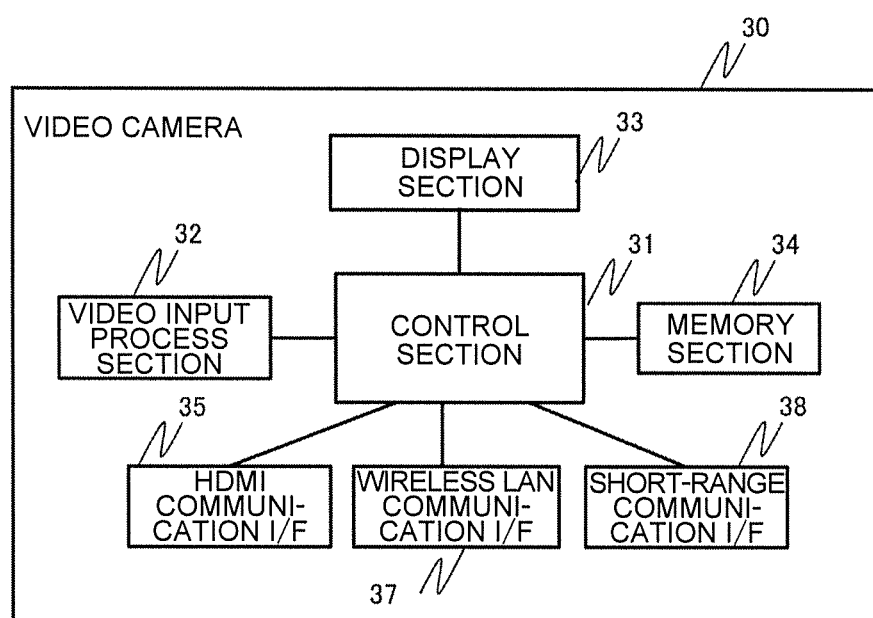
FIG. 4 is a block diagram of a video camera of the first embodiment.

FIG. 4 is a block diagram of the video camera 30 of the present embodiment. The video camera 30 is provided with a control section 31, a video input process section 32, a display section 33, a memory section 34, an HDMI communication I/F 35, a wireless LAN communication I/F 37, and a short-range communication I/F 38.

The control section 31 is a micro-processor unit that controls the entire video camera 30 according to a predetermined program.

The memory section 34 includes a program region, a temporary memory region, and a storage memory region. The program region is a region where a basic operation program and other application programs are expanded when such programs are executed. The temporary memory region temporarily holds data according to necessity in executing various application programs. The storage memory region stores various set values, various programs, moving image data, and the like even in a state where electricity is not supplied. For the storage memory region, a device such as a flash ROM, an SSD, an HDD is used for example.

The display section 33 is a display device such as a liquid crystal panel or an organic EL display for example. The display section 33 displays video data subjected to image processing by the video input process section 32 described below for example.

The video input process section 32 is provided with an imaging optical system, an imaging element, and a video signal processing system. The imaging optical system is provided with lenses, a diaphragm, and the like. The video signal processing system performs digital signal processing with respect to an inputted video signal.

The HDMI communication I/F 35 is an I/F section for HDMI communication. The HDMI communication I/F 35 is provided with a TMDS process section, an encoding section that encodes a video signal, and a CEC control section, and is connected to the television 10 and the like on a one-to-one basis.

The wireless LAN communication I/F 37 transmits/receives data to/from the television 10 or the smart phone 20 through a wireless LAN access point.

The short-range communication I/F 38 performs short-range wireless communication (NFC, IR communication, Bluetooth, and the like) with a wireless charger (a charging dock for example).

[Function Configuration]

Next, the function of the television 10, the smart phone 20, and the video camera 30 of the present embodiment will be explained.

[Television]

When the television 10 of the present embodiment detects that the video camera 30 that holds video data is connected through the HDMI communication I/F 15, the television 10 instructs the smart phone 20 so as to initiate a remote control application, and controls the cooperative operation thereafter. It may also be configured to initiate a remote control application after a sleep state is released when the smart phone 20 is in a sleep state. Also, various instructions to the smart phone 20 is executed through the wireless LAN communication I/F 17 or the short-range communication I/F 18. The wireless LAN communication I/F 17 and the short-range communication I/F 38 are referred to as a communication I/F when it is not particularly required to be discriminated.

Figure 2B:
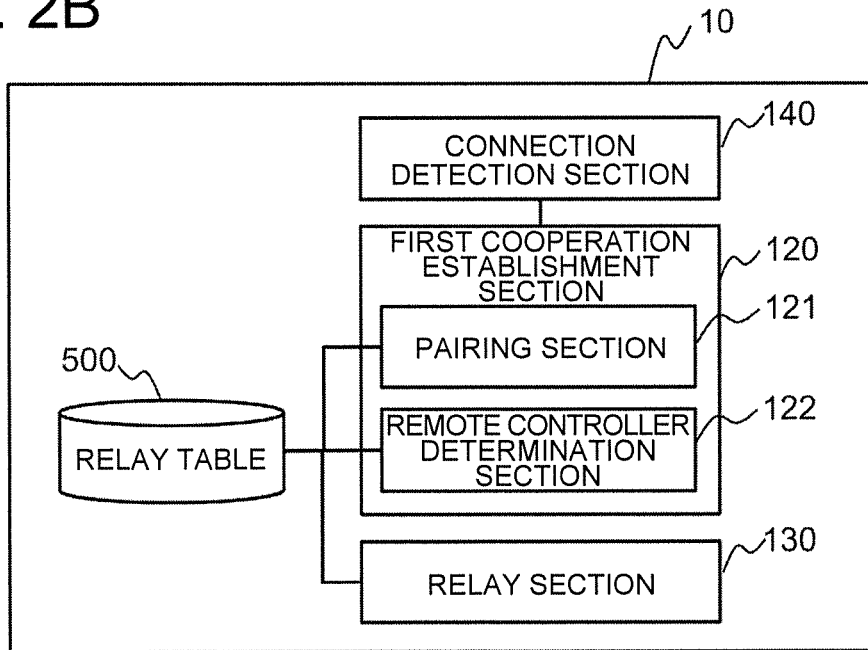
FIG. 2B is a functional block diagram of a video display device (TV) of the first embodiment.

In order to achieve the above, as shown in FIG. 2B, the television 10 of the present embodiment is provided with a first cooperation establishment section 120 that establishes cooperation among three parties of the television 10, the video camera 30, and the smart phone 20, a relay section 130 that controls a cooperative operation after establishing cooperation among three parties, and a connection detection section 140. Moreover, the first cooperation establishment section 120 is provided with a pairing section 121 and a remote controller determination section 122.

The connection detection section 140 detects that the video camera 30 is connected through the HDMI communication I/F 15, and notifies the first cooperation establishment section 120 of the event. In the present embodiment, a device ID is notified from the video camera 30 through the HDMI communication I/F 15. The connection detection section 140 detects connection by obtaining this device ID.

According to a request (pairing request) from various terminals (candidate smart phones) that possibly be a remote controller in the 3-party cooperation system such as the smart phone 20, the pairing section 121 associates a candidate video camera with the candidate smart phones. The candidate video camera associated is a video camera operable by the candidate smart phone and is a video camera having possibility of being connected. The result of the association is held as a relay table 500.

In the present embodiment, when an event that the video camera 30 is connected is notified from the connection detection section 140, the pairing section 121 receives device information from the video camera 30 and accumulates the device information. Therefore, the pairing section 121 accumulates the device information of the video camera 30 connected at present and the device information of the video camera 30 accumulated in the past.

The device information also includes information (device ID) that identifies the video camera 30, and relay application information. The relay application information includes the name (relay application name) of an application program (relay application) required when the video camera 30 is operated from the smart phone 20 through the television 10, and corresponding OS information of the smart phone 20.

The relay application information is an application program that instructs an operation instruction that the television 10 receives from the smart phone 20 through the communication I/F to the video camera 30 through the HDMI communication I/F 15 that is the communication I/F between the video camera 30.

Furthermore, when the pairing request is received from a candidate smart phone, the pairing section 121 of the present embodiment associates a candidate video camera that can be operated by the candidate smart phone with the candidate smart phone, and generates the relay table 500. The pairing request transmitted from the candidate smart phone includes identification information (device ID) of the candidate smart phone, and OS information of the candidate smart phone. The device ID may be an IP address and the like of the candidate smart phone, for example. Moreover, the pairing section 121 notifies the device ID of the candidate smart phone associated therewith to the candidate smart phone of the requesting source by return.

The pairing section 121 determines whether association is possible or not using, for example, the OS information of a smart phone included in the pairing request and corresponding OS information of a candidate external device.

Here, an example of the relay table 500 generated by the pairing section 121 is shown in FIG. 5. As shown in the present drawing, in the relay table 500 of the present embodiment, candidate video cameras 520 that are operable are registered associated with a device ID 510 of the candidate smart phone. Moreover, as information of the candidate video cameras 520, a device ID 521, a relay application name 522, and an install information (install) 523 that shows whether or not the relay application is installed are registered. Further, in FIG. 5, such case is exemplified that, as the install information 523, "1" is registered when the relay application is installed and "0" is registered when the relay application is not installed.

In addition, when plural candidate smart phones are associated with one candidate video camera, it is also possible to provide an order of priority to the plural candidate smart phones beforehand and to register the information to the relay table 500.

When the video camera 30 is connected through the HDMI communication I/F 15, the remote controller determination section 122 determines the smart phone 20 that is used as the remote controller in the 3-party cooperation system, and instructs the smart phone 20 determined to initiate the remote control application. The smart phone 20 is determined among the candidate smart phones registered in association with the connected video cameras 30 (candidate video cameras) referring to the relay table 500 generated by the pairing section 121.

For example, when the order of priority of the candidate smart phones is provided in the relay table 500, the smart phone 20 is determined according to the order of priority. Meanwhile, when the order of priority is not provided, for example, the candidate smart phone nearest to the television 10 at the time point is selected as the smart phone 20 determined. For example, communication by short-range wireless communication (NFC, IR communication, Bluetooth, and the like) or wireless LAN is performed between the television 10 and each candidate smart phone, and one with the highest radio wave strength is selected as the nearest candidate smart phone.

However, a method for selecting the smart phone 20 used as the remote controller out of plural candidate smart phones registered in the relay table 500 is not limited to it. For example, it may be configured to provide a notification to all registered candidate smart phones and to select the candidate smart phone transmitting the approval soonest as the smart phone 20 used as the remote controller.

Also, when communication with the smart phone 20 selected is interrupted, the remote controller determination section 122 repeats to determine the smart phone 20 used as the remote controller by the method described above.

The remote controller determination section 122 generates a start signal for initiating a remote control application that operates the video camera 30, and transmits the start signal to the determined smart phone 20 through the communication I/F. In the present embodiment, the start signal includes the device ID of each of the television 10 and the video camera 30. On the side of the smart phone 20 that receives this start signal, the remote control application that operates the video camera 30 is initiated.

After establishment of the 3-party cooperation, the relay section 130 executes a relay process according to a relay application. Specifically, the relay section 130 receives an operation instruction accepted by the smart phone 20 through the remote control application from the smart phone 20, and relays the operation instruction to the video camera 30. In addition, the relay section 130 processes data transferred from the video camera 30 according to the operation instruction.

Furthermore, the operation instruction is an instruction for operating the video camera 30. For example, in the present embodiment, an instruction for displaying an operation screen of the video camera 30 on the display section 13, and an instruction for displaying video data held by the video camera 30 on the display section 13, and so on are included.

However, in the television 10, a micro-processor of the control section 11 expands a program stored in the storage region of the memory section 14 in the program region and executes the program, and thus each function of the television 10 is achieved. Further, the relay table 500 is stored in the storage region. Out of each function achieved by the television 10, all or a part of the function may be achieved by hardware such as an ASIC (Application Specific Integrated Circuit) and a FPGA (field-programmable gate array). Also, when the television 10 and the video camera 30 are connected to each other by the HDMI cable, exchange of a control signal between the television 10 and the video camera 30 may be achieved by the CEC function.

[Smart Phone]

Figure 3B:
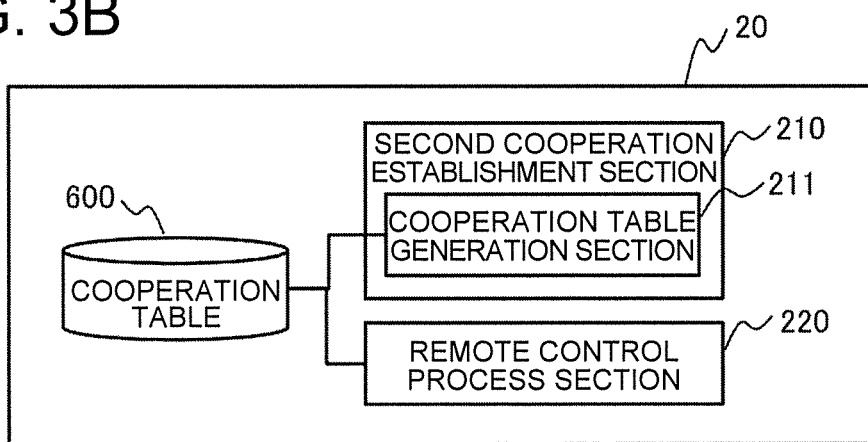
FIG. 3B is a functional block diagram of the smart phone of the first embodiment.

The smart phone 20 functions as the remote controller of the video camera 30 according to an instruction from the television 10. In order to achieve it, as shown in FIG. 3B, the smart phone 20 of the present embodiment is provide with a second cooperation establishment section 210 that establishes cooperation among 3 parties of the television 10, the video camera 30, and the smart phone 20, and a remote control process section 220. Also, the second cooperation establishment section 210 is provided with a cooperation table generation section 211.

The cooperation table generation section 211 generates a cooperation table 600 in order to achieve cooperation among the 3-parties. In the present embodiment, the cooperation table 600 is generated as a cooperation table associating the combination of a television (candidate television) and candidate video cameras and an application (remote control application) used for operation with each other, the television (candidate television) being operable by the smart phone 20 itself.

Specifically, a device ID of the candidate video camera notified from the television 10 as a result of issuing the pairing request to the television 10 is hold so as to be associated with a device ID of the television 10 of the notification source assuming the television 10 of the notification source as a candidate television. Also, based on the device ID of the candidate video camera and the device ID of the television 10 associated with each other, the remote control application for operation of the candidate video camera through the television 10 is determined.

Further, in the present embodiment, as described above, the remote control application functions the smart phone 20 as the remote controller that operates the video camera 30 through the television 10. That is to say, the remote control application is an application that accepts an instruction of displaying video data held by the video camera 30 on the display section 13 of the television 10, for example. This remote control application is held in general in the server 90 of the outside. The smart phone 20 of the present embodiment accesses to the server 90 through the internet, and acquires the pertinent application.

In FIG. 6, there is shown an example of the cooperation table 600 generated by the cooperation table generation section 211 of the present embodiment. As shown in the present drawing, in the cooperation table 600 of the present embodiment, for each candidate television, a device ID 610 of the candidate television, a device ID 620 of a candidate video camera that is a video camera operable through the candidate television, and information (remote control application name) 630 that identifies a remote control application for controlling the candidate video cameras respectively through the candidate television are registered so as to be associated with each other. Also, install information (install) 640 that shows whether or not the remote control application having the remote control application name 630 is installed is registered as well. Further, in FIG. 6, such case is exemplified that, as the install information 640, "1" is registered when the remote control application is installed and "0" is registered when the remote control application is not installed.

The remote control process section 220 executes a process for achieving the 3-party cooperation. Specifically, the process is executed by expanding the remote control application.

In the smart phone 20, a micro-processor of the control section 21 expands a program stored in the storage region of the memory section 24 in the program region and executes the program, and thus each function of the smart phone 20 is achieved. Further, the cooperation table 600 is stored in the storage region. Out of each function achieved by the smart phone 20, all or a part of the function may be achieved by hardware such as an ASIC and a FPGA.

[Video Camera]

When the video camera 30 of the present embodiment is connected to the television 10 through the HDMI communication I/F 35, the video camera 30 transmits information for controlling the video camera 30 itself to the television 10 of the connection counterpart. As described above, the present function may be achieved by the CEC function.

[Flow of 3-party Cooperation Process]

Figure 7:
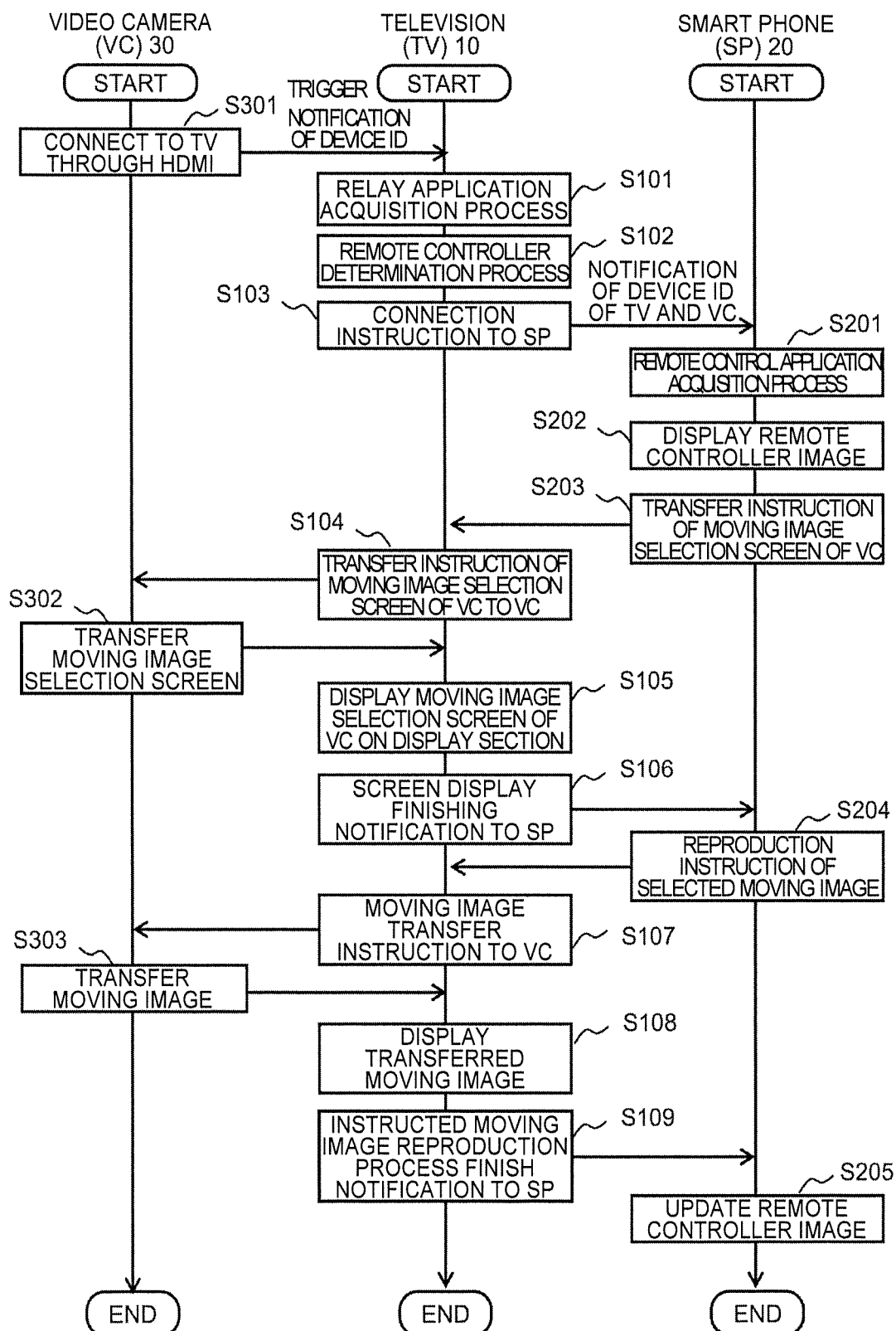
FIG. 7 is a flowchart of a 3-party cooperation process of the first embodiment.

A flow of a 3-party cooperation process by the television 10, the smart phone 20, and the video camera 30 having the functions described above will be explained. FIG. 7 is a flowchart for explaining a flow of a 3-party cooperation process of the present embodiment. Also, the relay table 500 and the cooperation table 600 are assumed to have been generated beforehand.

Further, below, explanation will be made exemplifying a case of selecting a desired moving image out of the moving images recorded in the memory section 34 of the video camera 30 by operating the smart phone 20, and displaying the desired moving image on the display section 13 of the television 10. However, the present invention is not limited to the example. Other than the instruction of selecting and displaying a moving image, for example, by an instruction for storing a moving image or a still image held by the video camera 30 in the memory section 14 of the television 10, and so on, this cooperation process can be applied in a similar manner.

First, when the video camera 30 is connected to the television 10 by the HDMI cable or when the electric source of the video camera 30 having been already connected to the television 10 by the HDMI cable is turned on (step S301), a trigger including the device ID of the video camera 30 is transmitted from the video camera 30 to the television 10.

In the television 10, the connection detection section 140 accepts a notification of the device ID, and transmits the device ID to the remote controller determination section 122. When the device ID is received, the remote controller determination section 122 of the television 10 refers to the relay table 500, executes a relay application acquisition process of acquiring the relay application (step S101), and acquires the relay application. Also, a remote controller determination process for determining a smart phone that is used as the remote controller is also executed (step S102), and the smart phone 20 is determined.

Further, the remote controller determination section 122 notifies the determined smart phone 20 of a connection instruction (step S103). Here, the device ID of the television 10 and the device ID of the video camera 30 are notified to the smart phone 20, and a command for prompting initiation of the remote control application is transmitted to the smart phone 20.

Figure 8:
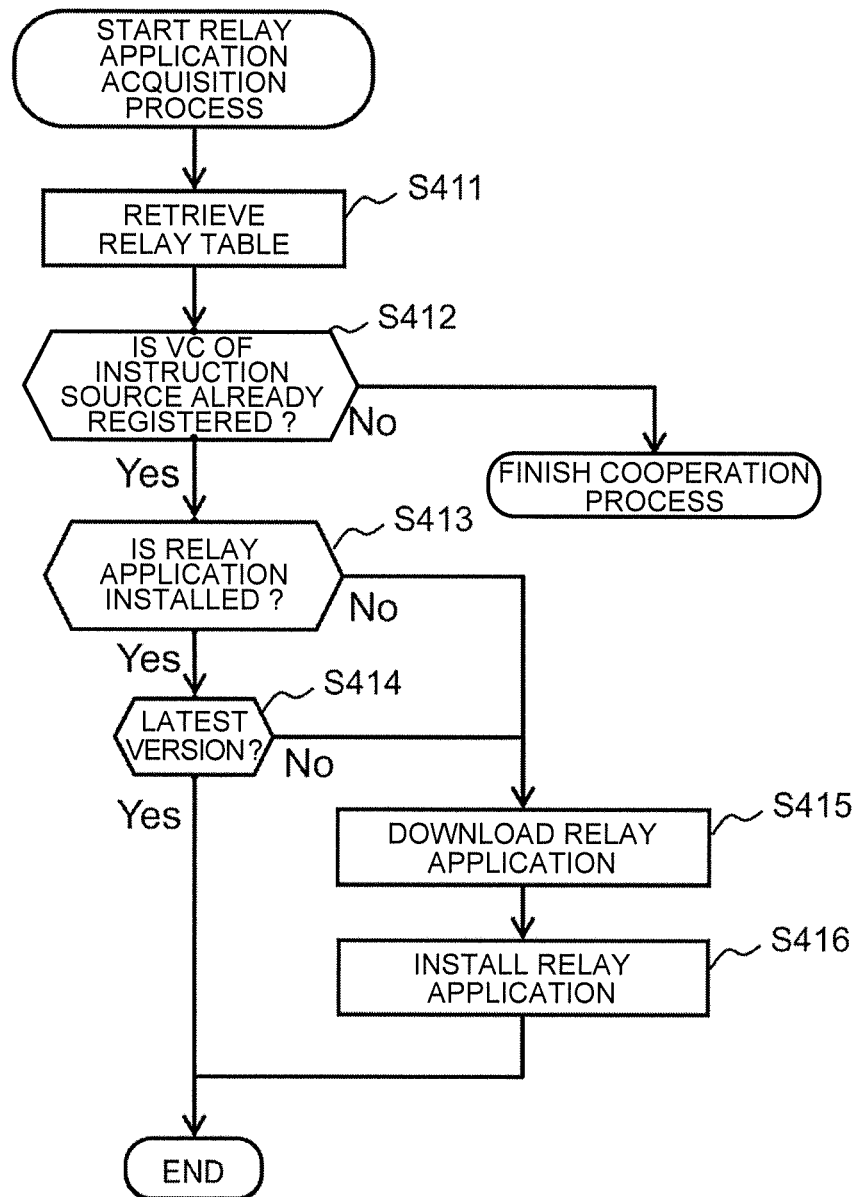
FIG. 8 is a flowchart of a relay application acquisition process of the first embodiment.

Here, the detail of the relay application acquisition process of the step S101 will be explained using FIG. 8.

First, the remote controller determination section 122 retrieves the relay table 500 (step S411), and determines whether or not the received device ID is registered (step S412). When the received device ID is not registered, the 3-party cooperation process is finished.

Meanwhile, when the received device ID is registered, the remote controller determination section 122 determines whether or not the relay application registered in association with the device ID 521 is already installed (step S413). When the relay application is already installed, the remote controller determination section 122 determines whether or not the relay application is of the latest version (step S414). Whether or not the relay application is of the latest version is determined by comparing a version information registered as a relay application information of the relay application and the version information of the latest version provided, the version information of the latest version provided being obtained from the server 90 accessing through the internet.

When the relay application of the latest version is installed, the process is finished. Meanwhile, when the relay application is not installed or when the relay application that is not the latest version is installed, the remote controller determination section 122 accesses to the server 90 through the internet so as to download the relay application of the latest version (step S415), installs the relay application of the latest version (step S416), and the relay application acquisition process is finished.

Also, it may be configured that the video camera 30 holds the relay application and the television 10 acquires the relay application from the video camera 30. Further, it may be configured to compare the version of the relay application stored in the server 90 and the version of the relay application stored in the video camera 30, and to appropriately acquire a new one.

Also, in the explanation above, it may be configured, even when the relay application is installed, to confirm the server 90 through the internet or to inquire the video camera 30 whether or not the installed relay application is of the latest version, and to install the latest version constantly. However, whether or not the installed relay application is of the latest version does not have to be confirmed.

Also, it may be configured that, when the relay application of the latest version is downloaded from the server 90 through the internet in a state where the relay application of an old version is stored in the video camera 30, the television 10 updates the stored relay application of an old version in the video camera 30 by the relay application of the latest version acquired from the server 90.

Figure 9:
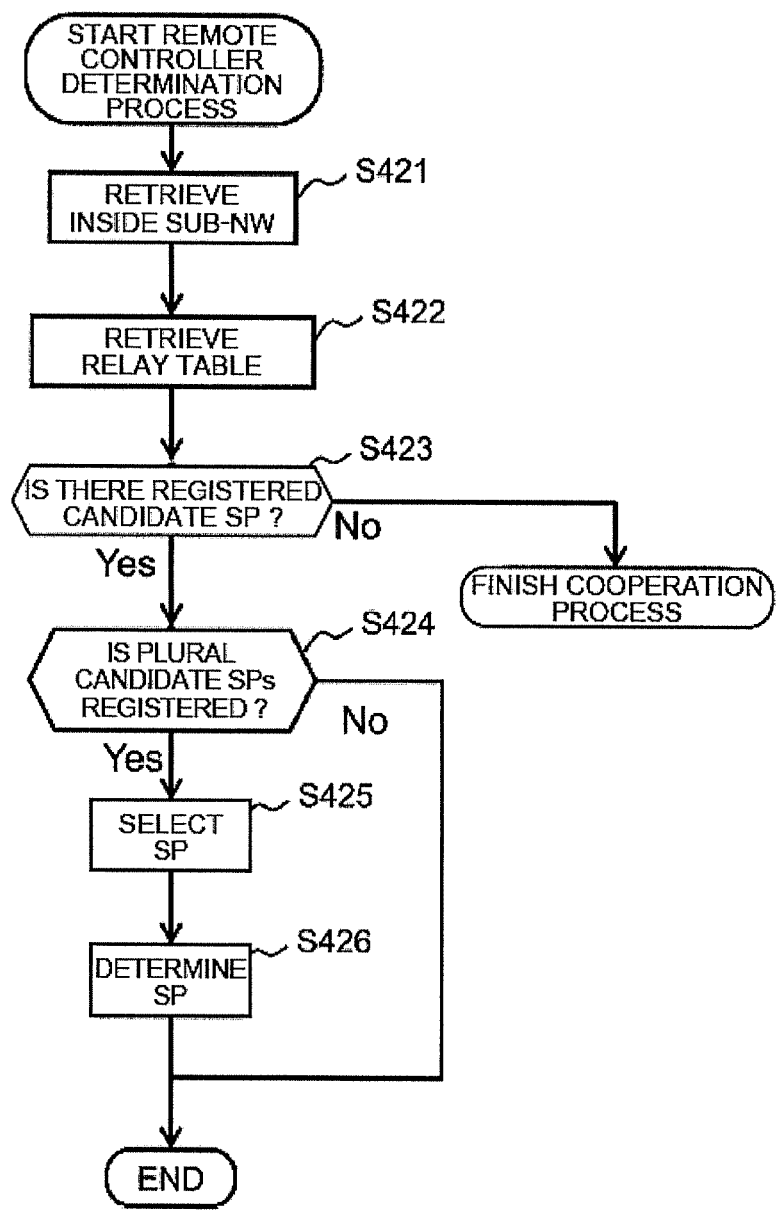
FIG. 9 is a flowchart of a remote controller determination process of the first embodiment.

Next, the detail of the remote controller determination process of the step S102 will be explained using FIG. 9.

First, the remote controller determination section 122 retrieves devices possibly to be the remote controller from devices connected to a same sub-network (sub-NM) of the wireless LAN of the television 10 (step S421), and extracts the retrieved devices. For example, out of various devices connected to the same sub-NW, a smart phone is retrieved.

Then, the remote controller determination section 122 retrieves the relay table 500 (step S422), and determines whether or not a candidate smart phone registered in association with the video camera 30 having the device ID received in the process of S101 among the smart phones extracted in the step S421 (step S423).

When a candidate smart phone is not registered, the 3-party cooperation process itself is finished. Also, it may be configured to notify the user, before finishing the 3-party cooperation process, of an event that a smart phone usable as the remote controller is not registered.

Meanwhile, when a candidate smart phone is registered, the remote controller determination section 122 determines the number of units of the registered candidate smart phones (step S424).

When plural units are registered, the remote controller determination section 122 selects one unit of the smart phone 20 out of the plural units (step S425), and determines the selected unit as the smart phone 20 to be used as the remote controller (step S426). Selection is performed by the method described above.

When the number of units of the registered candidate smart phones is one in the step S424 above, the registered candidate smart phone is determined as the smart phone 20 to be used as the remote controller (step S426). When the smart phone 20 that is used as the remote controller is determined, the remote controller determination section 122 finishes the remote controller determination process.

Further, this remote controller determination process is executed also when connection with the smart phone 20 that is used as the remote controller is interrupted due to some circumstance while the 3-party cooperation process is executed.

Returning to FIG. 7, when receiving the connection instruction, the remote control process section 220 of the smart phone 20 executes a remote control application acquisition process (step S201).

Figure 10:
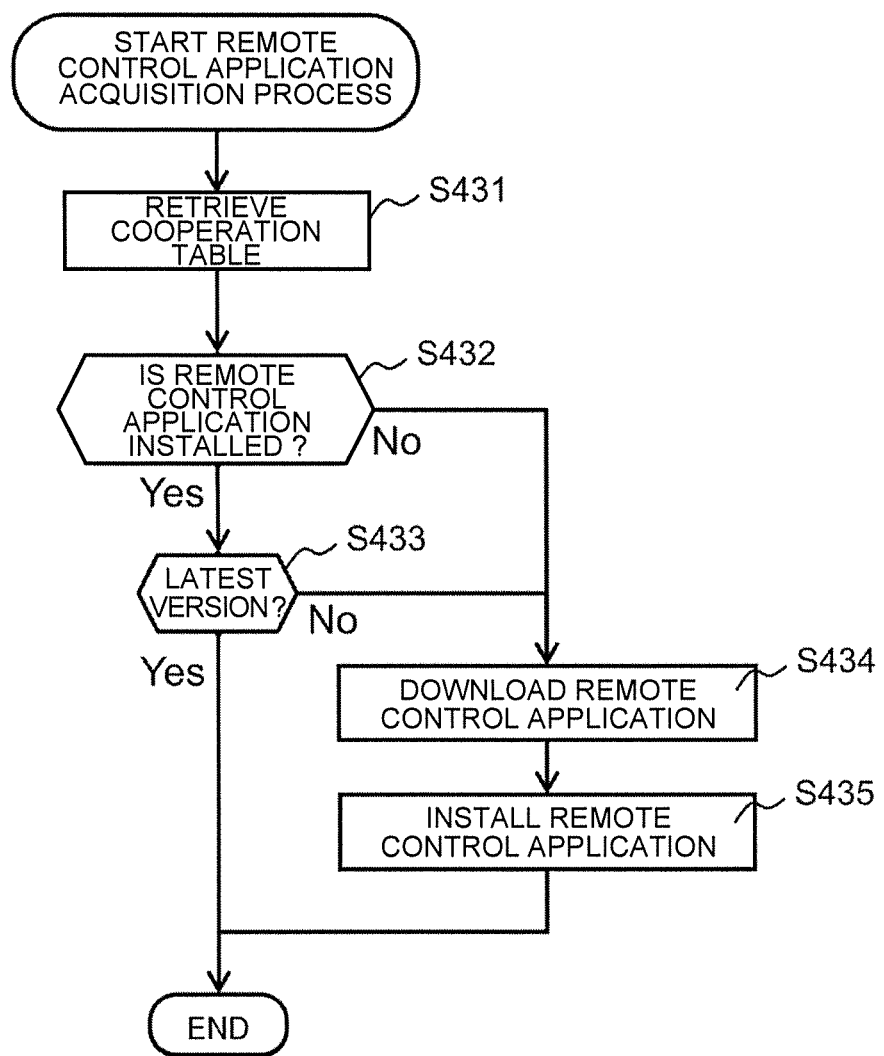
FIG. 10 is a flowchart of a remote control application acquisition process of the first embodiment.

The detail of the remote control application acquisition process will be explained according to FIG. 10.

The remote control process section 220 retrieves the cooperation table 600 using the device ID of the television 10 and the device ID of the video camera 30 which are notified from the television 10 (step S431), and determines whether or not a remote control application that is associated to both of the device IDs is installed (step S432).

When the remote control application is installed, the remote control process section 220 determines whether or not the version of the application is of the latest version (step S433). Whether or not the version of the application is of the latest version is determined by comparing a version information registered as a remote control application information of the remote control application and the version information of the latest version provided, the version information of the latest version provided being obtained from the server 90 accessing through the internet.

When the remote control application is not installed or when the remote control application that is not of the latest version is installed, the remote control process section 220 accesses to the server 90 so as to download the remote control application of the latest version (step S434). Then, the remote control process section 220 installs the remote control application of the latest version (step S435), and finishes the process.

Also, similarly to the relay application described above, whether or not the remote control application is of the latest version does not have to be determined. Furthermore, although explanation was made that the remote control application is downloaded from the server 90, the remote control application may be downloaded from the television 10. In this case, various remote control applications are stored beforehand in the storage memory region of the memory section 14 of the television 10. Further, it is also possible to compare the version of the remote control application stored in the server 90 and the remote control application stored in the television 10, and to acquire a newer one. Furthermore, it is also possible to store the remote control application downloaded from the server 90 through the internet in the storage memory region of the television 10.

Returning to FIG. 7, when the remote control application acquisition process is finished, the remote control process section 220 initiates the remote control application, and displays a remote controller image on the touch panel 23 of the smart phone 20 (step S202). The remote controller image is displayed in a scrollable mode, and the operation display allowing to select which of the television 10 or the video camera 30 is to be operated, the channel operation display, display of reproduction start/stop of the recorded moving image and so on are displayed.

Figure 11A:
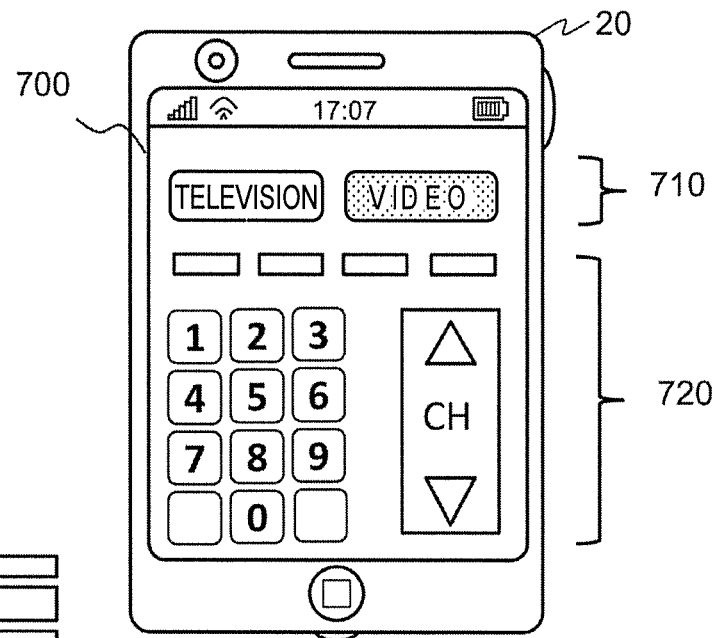
FIG. 11A and FIG. 11B are explanatory drawings for explaining a remote controller image of the first embodiment.
Figure 11B:
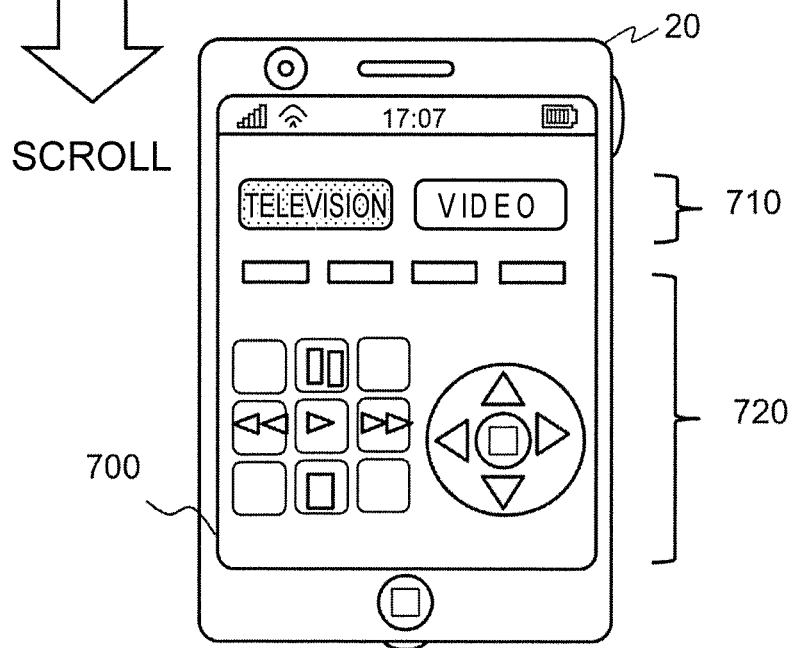

An example of the displayed remote controller image is shown in FIG. 11A and FIG. 11B. As shown in the present drawings, a remote controller image 700 of the present embodiment is provided with an operation object device selection region 710 and a remote control operation accepting region 720.

The operation object device selection region 710 accepts selection of a device of the object operating through this remote controller image 700. Either the television 10 or the video camera 30 is accepted. For example, as shown in these drawings, the operation object device selection region 710 is provided with buttons for accepting selection. These buttons are displayed so that the selected device can be identified.

In the remote control operation accepting region 720, an operation screen of a device selected in the operation object device selection region 710 is displayed. For example, when the television 10 is selected, a channel selection display and the like are displayed. Meanwhile, when the video camera 30 is selected, a screen display accepting an instruction such as selection of a moving image to be reproduced, reproduction start, reproduction stop and the like is displayed. Also, even when either of the television 10 or the video camera 30 is selected, sound volume control and the like are displayed commonly.

Further, the remote control operation accepting region 720 may be configured so that the operation screen changes by scrolling. In this case also, a device of an object that is operated by the operation screen may be displayed in an identifiable mode in the operation object device selection region 710.

This remote controller image 700 is only an example, and the way of display changes by the functions implemented in each device. Further, for example, display of device selection may be set to three units or more. Also, a remote controller image of integrating the remote control operation of each device is also possible. An example of it is an image that allows to reproduce the moving image of the video camera 30 and to simultaneously instruct the memory section 14 of the television 10 to record the moving image, and so on.

Returning to FIG. 7, when the remote controller image is displayed on the touch panel 23, the remote control process section 220 executes a transfer instruction of the moving image selection screen of the video camera 30 (step S203). This transfer instruction is transmitted from the smart phone 20 to the television 10. Then, the relay section 130 of the television 10 accepted the transfer instruction transmits the instruction to the video camera 30 of the relay destination (step S104).

The video camera 30 received the transfer instruction transfers data of the moving image selection screen to the television 10 (step S302). The moving image selection screen is a screen for selection of the moving image stored in the video camera 30, for example. The screen for selection is an image where a thumbnail image of a moving image is displayed, and so on for example.

In the television 10 received the data of the moving image selection screen, the relay section 130 displays the moving image selection screen of the video camera 30 on the display section 13 according to the data (step S105). Then, the relay section 130 provides a screen display finishing notification meaning that the screen display has finished to the smart phone 20 from which the transfer instruction is transmitted (step S106).

When the screen display finishing notification is accepted, in the smart phone 20, the remote control process section 220 makes itself in a state of capable of accepting remote control operation from the user. Thereby, the user can execute instruction to the video camera 30 while looking at the moving image selection screen displayed on the display section 13 of the television 10.

When an instruction by operation (operation instruction) from the user is accepted, the remote control process section 220 transmits the operation instruction to the television 10 (step S204). The operation instruction accepted here is a reproduction instruction for the selected moving image and so on, for example. The moving image is selected from the thumbnail images of the moving image displayed as the moving image selection screen on the television 10, for example.

When an operation instruction is received from the smart phone 20, in the television 10, the relay section 130 relays the operation instruction to the video camera 30 (step S107).

The video camera 30 received the instruction transfers data to the television 10 according to the operation instruction (step S303). For example, when a reproduction instruction for a predetermined moving image is received, data of the moving image is transferred to the television 10.

The relay section 130 of the television 10 displays the transferred data on the display section 13 (step S108), and transmits a process finish notification meaning that the relay process has finished to the smart phone 20 (step S109). For example, when moving image data are received, display of the moving image data is started.

In the smart phone 20 received the process finish notification, the remote control process section 220 updates the remote controller image (step S205). It may be configured that, when the remote control application is already installed, the smart phone 20 that is received the connection instruction notified from the television 10 in step S103 does not instruct automatic initiation of the remote control application but changes the color of an icon of the remote control application, and thereby notifies the user of an event that a notification is issued from the television 10. It may be configured that the user confirms that the color of the icon of the remote control application has changed and manually initiates the remote control application.

As described above, according to the present embodiment, cooperation of the video camera 30, the television 10, and the smart phone 20 is established triggered by connection of the video camera 30 to the television 10, for example.

Also, by remote control operation from the smart phone 20, the video camera 30 and the television 10 can be cooperatively controlled.

Thus, according to the present embodiment, cooperation between the devices can be automatically established even in an environment where not only a specific external device but also various kinds of external devices (video cameras) are possibly connected to a video display device (television). Therefore, a 3-party cooperation system with excellent operability and usability can be established without imparting excessive burden to a user.

Second Embodiment

Next, the second embodiment of the present invention will be explained. In the first embodiment, the 3-party cooperation process among the video display device, the external device, and the remote control terminal is achieved by that the video display device functions as a relay device. In the present embodiment, the remote control terminal leads to achieve cooperation.

That is to say, in the first embodiment, the television 10 is the center, and plays a role of controlling the entire system. Meanwhile, in the second embodiment, the smart phone 20 controls the entire system.

Figure 12:
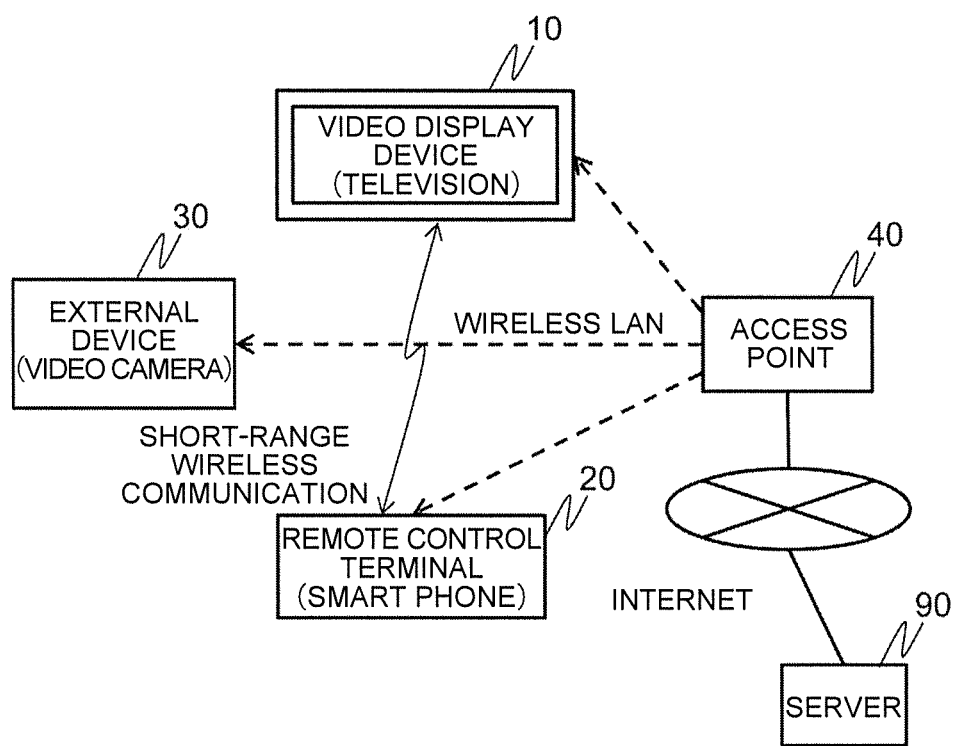
FIG. 12 is a configuration diagram of a 3-party cooperation system of a second embodiment.

A configuration diagram of a 3-party cooperation system of the present embodiment is shown in FIG. 12. As shown in the present drawing, the 3-party cooperation system of the present embodiment is provided with the video display device (television) 10, the remote control terminal (smart phone) 20, the external device (video camera) 30, and an access point 40.

The basic configuration of the television 10, the smart phone 20, and the video camera 30 of the present embodiment is similar to that of the first embodiment. Also, the access point 40 connects wireless LAN client devices such as the television 10, the smart phone 20, and the video camera 30 to each other, and connects these wireless LAN client devices to other networks.

Below, the present embodiment will be explained focusing configurations different from those of the first embodiment. Below, unless otherwise stated particularly, a portion common to the first embodiment is marked with a same reference sign, and detailed explanation thereof will be omitted.

In the present embodiment, the television 10, the smart phone 20, and the video camera 30 are connected to each other through the access point 40 through a wireless LAN, for example. That is to say, they are not connected to each other by the HDMI cable. Therefore, the television 10 and the video camera 30 do not have to be provided with the HDMI communication I/F 15 and the HDMI communication I/F 35.

[Functional Configuration]
[Video Camera]

Figure 13A:
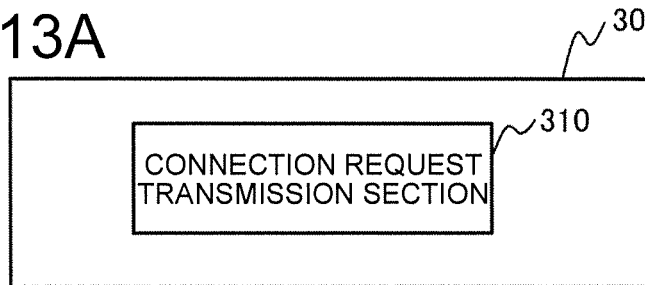
FIG. 13A is a functional block diagram of a video camera of the second embodiment.

As shown in FIG. 13A, the video camera 30 of the present embodiment is provided with a connection request transmission section 310 that transmits a connection request to all devices connected to the same sub-network of the wireless LAN through the access point 40. In the present embodiment, the connection request includes a device ID of the video camera 30 itself for example. Also, the device of the transmission destination of the connection request may be limited to the television 10 and the smart phone 20. The connection request is transmitted through the wireless LAN communication I/F 37.

In the video camera 30, a micro-processor of the control section 31 expands a program stored in the storage region of the memory section 34 in the program region and executes the program, and thus the functions of the video camera 30 are achieved. Out of each function achieved by the video camera 30, all or a part of the function may be achieved by hardware such as an ASIC and a FPGA.

[Smart Phone]

Figure 13B:
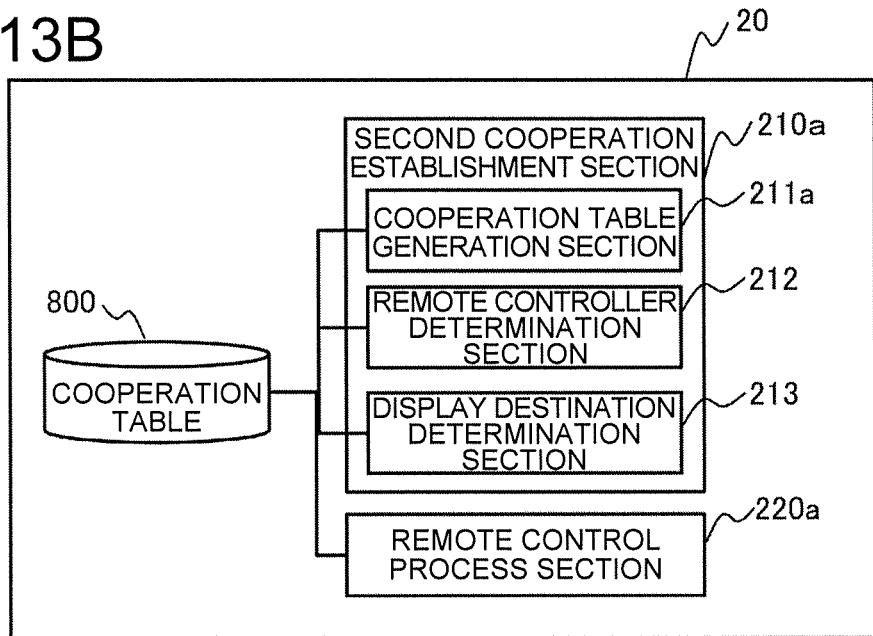
FIG. 13B is a functional block diagram of a smart phone of the second embodiment.

As shown in FIG. 13B, the smart phone 20 of the present embodiment is provided with a second cooperation establishment section 210a and a remote control process section 220a.

When a connection request is received from the video camera 30 through the wireless LAN communication I/F 27, the second cooperation establishment section 210a initiates the remote control application of each of the video camera 30 and the television 10. Therefore, the second cooperation establishment section 210a is provided with a cooperation table generation section 211a, a remote controller determination section 212, and a display destination determination section 213.

The cooperation table generation section 211a executes pairing of devices to be cooperated, and generates a cooperation table 800. Pairing is executed using short-range wireless communication and the like for example. For example, known means such as executing a designated button operation between devices that are brought close to each other only has to be used, and there is no limitation. Also, for example, it may be also configured that the smart phone 20 accesses to the access point 40 and selects the television 10 and the video camera 30, out of a list of connected devices obtained. Thereby, the kind of the device and the device ID that identifies the device can be obtained. The kind of the device is information that can determine a video display device, an image storage device, and the like, and the device ID is an IP address and the like, for example.

Figure 14:
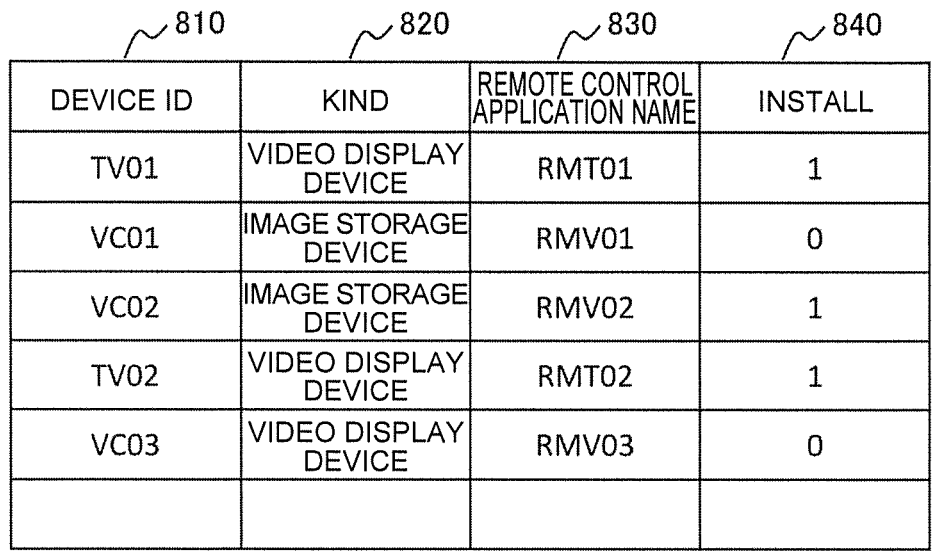
FIG. 14 is an explanatory drawing for explaining a cooperation table of the second embodiment.

With respect to the device on the list of devices obtained by pairing, the cooperation table generation section 211a accesses to the server 90 and the like and acquires information of the remote control application of the device (remote control application name for example), based on the device ID (IP address). By being associated the obtained information of the remote control application of the device with the device ID, the cooperation table 800 is generated as shown in FIG. 14.

Also, in acquiring the information of the remote control application, the smart phone 20 also determines whether or not cooperation is possible. For example, there is also a case where a remote control application for an OS of the smart phone 20 is not prepared. A device where only such remote control application is prepared is determined to be incapable of cooperation, and is not registered in the cooperation table 800.

In the cooperation table 800 generated, a device ID 810, information (kind) 820 that identifies the kind of the device, information (remote control application name) 830 of the remote control application of the device, and install information (install) 840 that shows whether or not the identified remote control application by the remote control application name 830 is installed are registered so as to be associated with each other. Also, in FIG. 14, such case is exemplified that, as the install 840, "1" is registered when the remote control application is installed and "0" is registered when the remote control application is not installed. The cooperation table 800 of the present embodiment is registered in the memory section 24 of the smart phone 20.

When the connection request from the video camera 30 is accepted, the remote controller determination section 212 executes a remote controller determination process of determining the smart phone 20 that is used as a remote controller among all smart phones connected to the same sub-network.

Specifically, the remote controller determination section 212 determines whether or not the device ID included in the connection request is registered in the cooperation table 800 held by the smart phone 20 itself, and finishes the process when the device ID is not registered in the cooperation table 800. Meanwhile, when the device ID is registered in the cooperation table 800, the smart phone 20 itself is determined to be a candidate smart phone that can be the remote controller. Also, the remote controller determination section 212 determines whether or not there are other smart phones which can be candidate smart phones in a similar manner among the smart phones connected to the same sub-network.

At this time, when there is no other candidate smart phone, the smart phone 20 itself is determined to be the smart phone 20 that is used as the remote controller. Meanwhile, when there are other candidate smart phones, information is exchanged among the candidate smart phones, and which of the candidate smart phones is to be the smart phone 20 used as the remote controller is determined. Determination is made using a method of distributed arbitration for example.

As a method for selecting the smart phone 20 used as the remote controller, a method of determining beforehand an order of priority among smart phones and selecting a candidate smart phone that has the highest order of priority, a method of selecting a candidate smart phone that is closest to the video camera 30, and so on are possible. The distance between the video camera 30 and the smart phone 20 is calculated by identifying the installation position of the video camera 30 and estimating the position of the smart phone 20 from the access point 40 by the GPS or the radio wave intensity of the wireless LAN.

When communication with the smart phone 20 that is selected as the remote controller is interrupted after starting the 3-party cooperation process, the video camera 30 issues a connection request again. At this time, the remote controller determination section 212 receives the connection request, executes the remote controller determination process, determines the smart phone 20 used as the remote controller, and thereby executes selection again.

Also, when the display destination determination section 213 described below determines the television 10 that displays an image, the remote controller determination section 212 of the present embodiment determines whether or not the remote control application for each of the video camera 30 and the television 10 used for the 3-party cooperation is installed in the cooperation table 800. After the determination, the remote controller determination section 212 acquires the remote control application according to necessity, and installs the remote control application.

When the smart phone 20 itself is determined to be the smart phone 20 used as the remote controller, the display destination determination section 213 determines the television 10 to be a display destination (display destination device) of an image of the video camera 30, out of the televisions connected to the same sub-network.

When there are plural sets of such television (candidate television) connected to the same sub-network and registered in the cooperation table 800, one of them is selected as the television 10 of the display destination device. Selection of the television 10 of the display destination device is executed, for example, by a method of determining beforehand an order of priority among the candidate televisions and selecting a television that has the highest order of priority, a method of making a candidate television that is closest to the smart phone 20 to be the television 10 of the display destination device, a method of making a candidate television that is closest to the video camera 30 to be the television 10 of the display destination device, or a method of displaying plural sets of the candidate television in a list and allowing the user to select the television 10 of the display destination device, and so on.

Also, when a candidate television closest to the smart phone 20 is selected, for example, short-range wireless communication is performed between each candidate television and the smart phone 20, and a candidate television whose radio wave intensity at that time is highest is made the candidate television closest to the smart phone 20. When a candidate television closest to the video camera 30 is selected, for example, with respect to the video camera 30 and each candidate television, the video camera 30 and each candidate television respectively acquire positional information using a GPS function and the like not illustrated, the distance between the video camera 30 and each candidate television is detected from each of the acquired positional information, and the closest candidate television is determined.

The remote control process section 220a executes a 3-party cooperation process among the smart phone 20, the television 10 of the display destination device, and the video camera 30. In the present embodiment, a remote control application for the television 10 of the display destination device and a remote control application for the video camera 30 are initiated, and both are executed respectively according to an instruction of the user.

A remote controller image displayed on the touch panel 23 of the smart phone 20 when both of the remote control applications are initiated is similar to the remote controller image of FIG. 11A and FIG. 11B of the first embodiment. In the present embodiment, when an operation object device is selected through the operation object device selection region 710, a remote control application of the device is operated responding to the selection.

For example, when the television 10 is selected, the remote controller image (FIG. 11A for example) 700 for the television 10 is displayed on the touch panel 23 of the smart phone 20. Then, an instruction accepted through the screen is dispatched toward the television 10. In the present embodiment, for example, a command having an address of an IP address of the television 10 is dispatched toward the access point 40.

Also, when the video camera 30 is selected, the remote controller image (FIG. 11B for example) 700 for the video camera 30 is displayed on the touch panel 23 of the smart phone 20. Then, an instruction accepted through the remote controller image is dispatched toward the video camera 30. In the present embodiment, for example, a command having an address of an IP address of the video camera 30 is dispatched toward the access point 40.

In the smart phone 20, a micro-processor of the control section 21 expands a program stored in the storage region of the memory section 24 in the program region and executes the program, and thus each function of the smart phone 20 is achieved. Further, the cooperation table 800 is stored in the storage region. Out of each function achieved by the smart phone 20, all or a part of the function may be achieved by hardware such as an ASIC and a FPGA.

[Television]

Figure 13C:
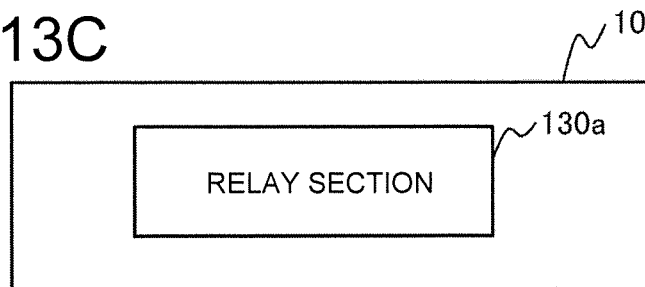
FIG. 13C is a functional block diagram of a television of the second embodiment.

The television 10 of the present embodiment does not execute relay for the 3-party cooperation. Therefore, as shown in FIG. 13C, the first cooperation establishment section 120 and the relay table 500 do not have to be provided with. Also, a relay section 130a is provided with instead of the relay section 130.

The relay section 130a of the present embodiment receives a device ID that identifies the transmission source of data and an operation instruction for the data from the smart phone 20. Also, when data are received from the video camera 30 that has the received device ID, the relay section 130a processes the data according to the operation instruction received. The operation instruction received is to display the data on the display section 13, to store the data in the memory section 14, and so on, for example. When the process is finished, the relay section 130a notifies to the smart phone 20 of the event. Further, the device ID, the operation instruction, and the data are received through the wireless LAN communication I/F 17.

[Flow of 3-party Cooperation Process]

Figure 15:
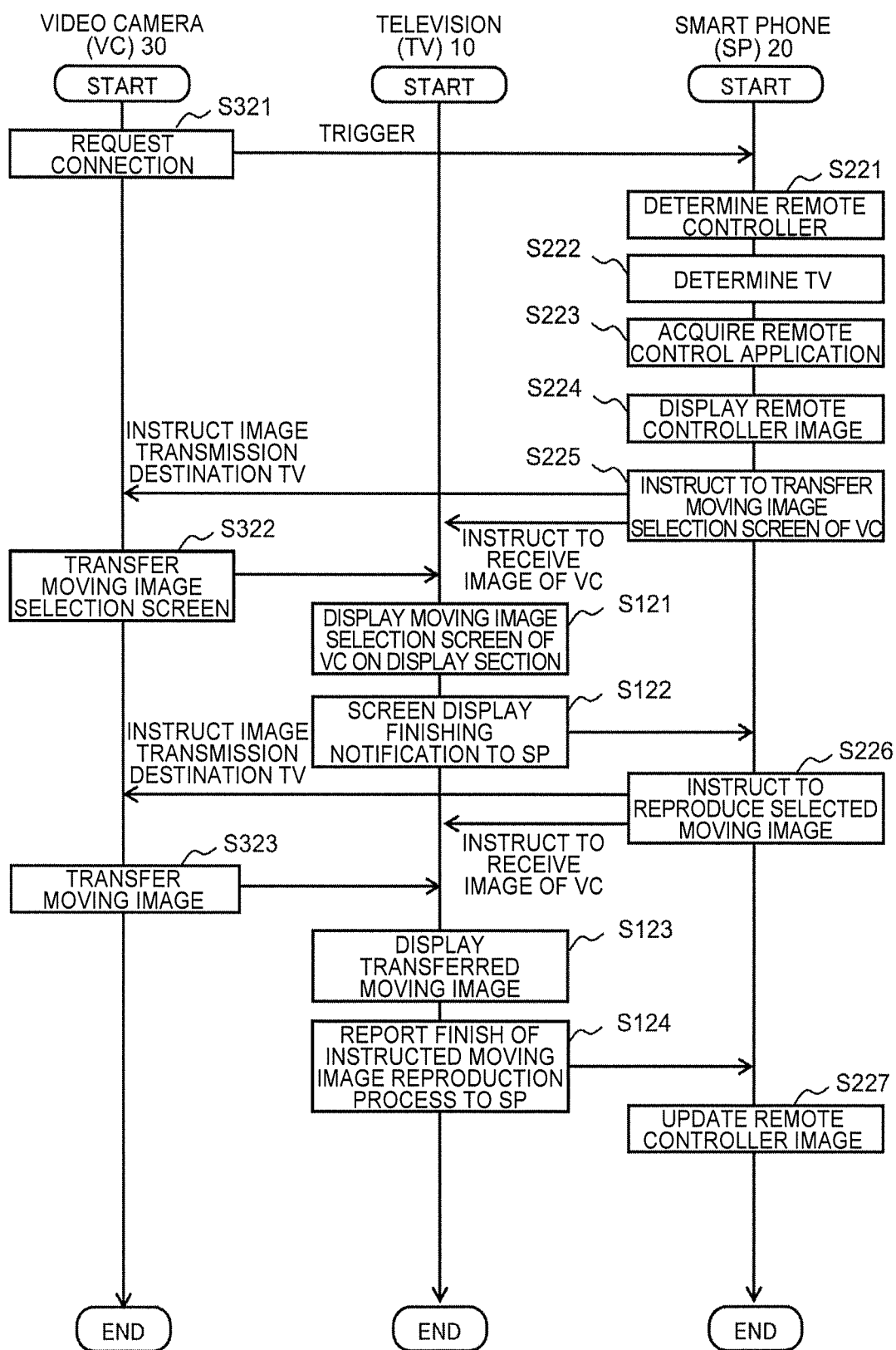
FIG. 15 is a flowchart of a 3-party cooperation process of the second embodiment.

A flow of the 3-party cooperation process of the present embodiment by the television 10, the smart phone 20, and the video camera 30 having the functions described above will be explained. FIG. 15 is a flowchart for explaining a flow of the 3-party cooperation process of the present embodiment. The cooperation table 800 is assumed to have been generated beforehand.

Here also, similarly to the first embodiment, explanation will be made exemplifying a case of selecting a desired moving image by operation from the smart phone 20 out of moving images recorded in the memory section 34 of the video camera 30, and displaying the desired moving image on the display section 13 of the television 10. Also, the 3-party cooperation process of the present embodiment is not particularly limited to this example but includes remote control operation other than the example described above as far as it is ordinary remote control operation executed by the video camera 30 and the television 10 such as operation of storing a moving image or a still image held by the video camera 30 in the memory section 14 of the television 10, for example.

First, the connection request transmission section 310 of the video camera 30 transmits a connection request through the access point 40 (step S321). The connection request is transmitted to all smart phones connected to the same sub-network.

When the connection request from the video camera 30 is received, the remote controller determination section 212 of all smart phones connected to the same sub-network executes a remote controller determination process, and determines the smart phone 20 to be the remote controller in this 3-party cooperation process (step S221). Determination is executed by the method described above.

Thereafter, the display destination determination section 213 of the smart phone 20 determined in the step S221 determines the television 10 of the display destination device out of all televisions connected to the same sub-network (step S222).

Also, the remote controller determination section 212 acquires the remote control application (step S223). The flow of the acquisition process for the remote control application is generally similar to that of the acquisition process for the remote control application explained in FIG. 10 of the first embodiment. However, in the present embodiment, the present process is executed for each of the television 10 and the video camera 30.

That is to say, the remote controller determination section 122 retrieves the cooperation table 800 using the device ID of the video camera 30 and the device ID of the determined television 10 being notified of, and determines whether or not the remote control applications in association with each of the device ID are installed. Also, when the remote control application is installed, the remote controller determination section 122 determines whether or not the version of the application is of the latest version. When the remote control application is not installed or when the remote control application that is not of the latest version is installed, the remote control application of the latest version is downloaded from a corresponding server and is installed.

When the remote control application acquisition process is finished, the remote control process section 220a of the smart phone 20 initiates each remote control application, and displays a remote controller image on the touch panel 23 of the smart phone 20 (step S224).

Thereafter, the remote control process section 220a executes a transfer instruction for a moving image selection screen of the video camera 30 (step S225). This transfer instruction is transmitted from the smart phone 20 to the television 10 and the video camera 30 through the access point 40. Also, the transfer instruction includes identification information (IP address for example) of each of the television 10, the smart phone 20, and the video camera 30.

Then, the video camera 30 that is received the transfer instruction transfers data of the moving image selection screen to the television 10 of the display destination device (step S322). The moving image selection screen is a screen that selects a moving image stored in the video camera 30, for example, similarly to the first embodiment. The screen that selects a moving image is an image where a thumbnail image of a moving image is displayed and so on, for example.

The relay section 130a of the television 10 that is received the data of the moving image selection screen displays the moving image selection screen of the video camera 30 on the display section 13 according to the data (step S121). Also, the relay section 130a issues a screen display finish notification meaning that the screen display has finished to the smart phone 20 of the transmission source (step S122).

When the screen display finish notification is accepted, the remote control process section 220a of the smart phone 20 is to be a state of capable of accepting the remote control operation from the user. Thereby, the user can instruct to the video camera 30 while looking at the moving image selection screen displayed on the display section 13 of the television 10.

When an operation instruction from the user is accepted, the remote control process section 220a transmits the instruction to the television 10 and the video camera 30 (step S226). The operation instruction accepted here is a reproduction instruction for the selected moving image and so on, for example. The moving image is selected from the thumbnail images of the moving image displayed as the moving image selection screen on the television 10, for example.

In the video camera 30 that is received the instruction, data are transferred to the television 10 according to the operation instruction (step S323). For example, when a reproduction instruction for a predetermined moving image is received as the operation instruction, data of the moving image is transferred to the television 10.

The relay section 130a of the television 10 displays the transferred data on the display section 13 (step S123), and transmits a process finish notification meaning that the display process has finished to the smart phone 20 (step S124). For example, when moving image data are received, display of the moving image data is started.

The remote control process section 220a of the smart phone 20 that is received the process finish notification updates the remote controller image (step S227).

As explained above, according to the present embodiment, the video camera 30 issues connection request through the access point 40, thereby the television 10 of the display destination and the smart phone 20 that is used as the remote controller are determined automatically, and the 3-party cooperation process is executed among them. That is to say, the user can operate the video camera 30 and the television 10 by operating the smart phone 20 so that image data held by the video camera 30 can be displayed on the television 10.

Thus, according to the present embodiment, similarly to the first embodiment, a 3-party cooperation system with excellent operability can be achieved with less burden.

In the second embodiment described above, it is configured that the 3-party cooperation process is started triggered by that the video camera 30 transmits a connection request to the smart phone 20 connected to the same sub-network through the access point 40; however, the present invention is not limited to it.

For example, it may be also configured that the 3-party cooperation process is started triggered by that the video camera 30 is placed on a charging dock. With respect to the charging dock, for example, wireless charging or charging from a power outlet is possible, and wireless charging or charging from a power outlet is selected according to the support condition of the video camera 30 placed. Also, the charging dock is configured so as to be capable of notifying the video camera 30 of the charging dock device ID by short-range communication (NFC, IR communication, Bluetooth, and the like).

In this case, when the video camera 30 is placed on the charging dock, for example, wireless charging is started, and the video camera 30 receives the ID of the charging dock by NFC communication. Then, the video camera 30 transmits the device ID of the video camera 30 itself and the device ID of the charging dock to all devices connected to the same sub-network of the wireless LAN as a trigger.

Thereby, the 3-party cooperation process is executed only by placing the video camera 30 on the charging dock. That is to say, the user can control the video camera 30 and the television 10 by a predetermined smart phone 20 only by placing the video camera 30 on the charging dock.

Also, in the second embodiment, the kind and the remote control application of the device are registered for each device in the cooperation table 800; however, the present invention is not limited to it. For example, when a remote control application for each combination of the television and the video camera can be obtained, the cooperation table may be configured to be similar to that of the first embodiment.

That is to say, the cooperation table generation section 211a accesses to the server 90, and extracts, for each candidate television, a video camera having a remote control application that is capable of cooperative operation with the candidate television. Then, the cooperation table generation section 211a registers the obtained video camera as a candidate video camera along with information of the remote control application of the video camera.

In this case, similarly to the first embodiment, the remote control process section 220a expands the remote control application held by the cooperation table in association with the video camera 30 and the determined television 10, and executes the remote control process.

Also, in each embodiment described above, when a remote control application is not provided in the smart phone 20, the remote control application is automatically downloaded from a server through the internet and is installed. However, the present invention is not limited to it. For example, it may be also configured that a prompt display for downloading the remote control application is displayed on the touch panel 23 of the smart phone 20 and downloading and installing are performed after accepting the instruction of the user. The same is applicable also to downloading and installing of the relay application for the television 10 of the first embodiment.

Above, examples of the embodiments of the present invention have been explained. It is needles to mention that the configuration achieving the technology of the present invention is not limited to the embodiments described above, and various modifications are possible. Also, the numerical figures and the like expressed in the text and the drawings are only examples, and even when different figures and the like might be used, the effect of the present invention is not detracted.

The functions and the like of the present invention described above may be achieved by hardware by that a part or all of the present invention is designed using an integrated circuit for example and so on. Also, the functions and the like of the present invention described above may be achieved by software by that a micro-processor unit and the like interpret and execute a program that achieves the function and the like of each. Further, hardware and software may be used in combination.

Also, control lines and information lines shown in the drawings show those considered to be necessary for explanation, and do not necessarily show all of the control lines and information lines of the product.

REFERENCE SIGNS LIST

10 . . . Video display device (television)
11 . . . Control section
12 . . . TV tuner
13 . . . Display section
14 . . . Memory section
15 . . . HDMI communication I/F
16 . . . Wired LAN communication I/F
17 . . . Wireless LAN communication I/F
18 . . . Short-range communication I/F
20 . . . Remote control terminal (smart phone)
21 . . . Control section
22 . . . Mobile network communication I/F
23 . . . Touch panel
24 . . . Memory section
27 . . . Wireless LAN communication I/F
28 . . . Short-range communication I/F
30 . . . External device (video camera)
31 . . . Control section
32 . . . Video input process section
33 . . . Display section
34 . . . Memory section
35 . . . HDMI communication I/F
37 . . . Wireless LAN communication I/F
38 . . . Short-range communication I/F
40 . . . Access point
90 . . . Server
120 . . . First cooperation establishment section
121 . . . Pairing section 122 . . . Remote controller determination section
130 . . . Relay section
130a . . . Relay section
140 . . . Connection detection section
210 . . . Second cooperation establishment section
210a . . . Second cooperation establishment section
211 . . . Cooperation table generation section
211a . . . Cooperation table generation section
212 . . . Remote controller determination section
213 . . . Display destination determination section
220 . . . Remote control process section
220a . . . Remote control process section
310 . . . Connection request transmission section
500 . . . Relay table
510 . . . Device ID of candidate smart phone
520 . . . Candidate video camera
521 . . . Device ID of candidate video camera
522 . . . Relay application name
523 . . . Install information
600 . . . Cooperation table
610 . . . Device ID of candidate television
620 . . . Device ID of candidate video camera
630 . . . Remote control application name
640 . . . Install information
700 . . . Remote controller image
710 . . . Operation object device selection region
720 . . . Remote control operation accepting region
800 . . . Cooperation table
810 . . . Device I/D
820 . . . Kind
830 . . . Remote control application name
840 . . . Install information

The invention claimed is:

1. A video display device to which an external device and a smart phone are connectable, the smart phone including a display and remotely operating the external device, the video display device comprising:
a processor configured to:
detect a connection of the external device to the video display device; and
generate a start signal for initiating an application software on the smart phone, the application software displaying, on the display of the smart phone, an operation screen for accepting an operation instruction to the external device; and
a communication interface configured to transmit the start signal to the smart phone,
wherein the processor is configured to use detection of the connection of the external device as a trigger to generate the start signal.

2. The video display device according to claim 1, further comprising a display,
wherein the operation instruction is an instruction to display video data held by the external device on the display.

3. The video display device according to claim 1, wherein the processor is further configured to refer to a relay table generated beforehand and to select the smart phone out of candidates of smart phones registered in association with the external device where the connection is detected in the relay table, and the relay table is a table generated according to a request from each of the candidates of the smart phones, the table including candidates of external devices in association with the candidate of the smart phones of request sources, the candidates of the external devices being operable by the candidates of the smart phones and being possibly connected to the video display device.

4. The video display device according to claim 3, wherein the processor is further configured to generate the relay table.

5. The video display device according to claim 1,
wherein the communication interface further receives the operation instruction from the remote control terminal, and
the processor is further configured to relay the operation instruction received through the communication interface to the external device.

6. The video display device according to claim 1, wherein the external device is wire-connected.

7. A cooperative control method in a video display device capable of connecting an external device and a smart phone, the smart phone including a display remotely operating the external device, the method comprising:
detecting a connection of the external device;
generating, by using detection of the connection of the external device as a trigger, a start signal for initiating an application software on the smart phone, wherein the application software displays, on the display of the smart phone, an operation screen for accepting an operation instruction to the external device;
transmitting the start signal to the smart phone; and
transmitting the operation instruction to the external device, the operation instruction being accepted by the smart phone through the application software.

8. A cooperative control method in a device cooperation system comprising an external device, a video display device, and a smart phone, the smart phone accepting operation from a user, the cooperative control method comprising:
by the video display device, detecting a connection of the external device, and transmitting, to the smart phone, a start signal which is generated by using detection of the external device as a trigger, wherein the start signal initiates an application software on the smart phone, wherein the application software displays, on a display of the smart phone, an operation screen for accepting an operation instruction to the external device;
by the smart phone, displaying the operation screen of the application software on the display of the smart phone when receiving the start signal;
by the smart phone, transmitting the operation instruction accepted through the operation screen to the video display device;
by the video display device, transmitting the operation instruction obtained from the smart phone to the external device; and
by the external device, transmitting video data held by the external device to the video display device according to the operation instruction.

* * * * *